United States Patent [19]

Unjo et al.

[11] Patent Number: 4,659,952
[45] Date of Patent: Apr. 21, 1987

[54] MOTOR AIR GAP BEARING ARRANGEMENT

[75] Inventors: Naoki Unjo; Takamichi Fuke, both of Furukawa, Japan

[73] Assignee: Alps Electric Co., Ltd., Japan

[21] Appl. No.: 882,285

[22] Filed: Jul. 7, 1986

Related U.S. Application Data

[63] Continuation of Ser. No. 686,229, Dec. 26, 1984, abandoned.

[30] Foreign Application Priority Data

Dec. 27, 1983 [JP] Japan .................. 58-214899[U]

[51] Int. Cl.[4] .................. H02K 7/08; H02K 5/16
[52] U.S. Cl. .................. 310/90; 384/300
[58] Field of Search .................. 310/45, 49 R, 86, 87, 310/88, 89, 90; 384/299, 300

[56] References Cited

U.S. PATENT DOCUMENTS

| 2,623,353 | 12/1952 | Gerard | 384/300 |
| 3,011,219 | 12/1961 | Williams | 384/300 |
| 4,382,199 | 5/1983 | Isaacson | 310/87 |
| 4,384,226 | 5/1983 | Sato et al. | 310/90 |
| 4,476,449 | 10/1984 | Gray et al. | 310/49 R |

FOREIGN PATENT DOCUMENTS 206878 3/1957 Australia .................. 310/86

Primary Examiner—Patrick R. Salce
Assistant Examiner—D. L. Rebsch
Attorney, Agent, or Firm—Guy W. Shoup

[57] ABSTRACT

In a stepping motor comprising a stator including a plurality of stator plates, and a rotor made of a permanent magnet, a coating layer made of a nonmagnetic material is applied to the stator plates, and the rotor is rotated within the stator plates while the rotor is maintained in a closely adjacent relation contactable with the coating layer of the stator plates.

4 Claims, 8 Drawing Figures

MOTOR AIR GAP BEARING ARRANGEMENT

This is a continuation application from application Ser. No. 686,229 filed Dec. 26, 1984 now abandoned.

BACKGROUND OF THE INVENTION

1. Field of the Invention

This invention relates to a stepping motor to be used in various apparatus such as floppy disc driving devices, printers and automatic devices.

2. Description of Prior Art

FIG. 1 is a perspective view of a stator of a conventional stepping motor, and FIG. 2 is a sectional view of the stepping motor. As shown in the drawing, the stepping motor has a rotor 2 fixed to a rotor shaft 1 which is rotatably supported by a bearing 3 in co-operation with an E washer 4 and a wave washer 5. Stator plates 8, 9, 10 and 11 are arranged in an equally spaced apart relation along a cylindrical surface formed around the rotor shaft 1, in a manner such that the stator plates 8 and 9 as well as 10 and 11 are displaced from each other by an electric angle of 90°, while the stator plates 9 and 10 are displaced from each other by an electric angle of 45°. The stator plates thus arranged are secured to a housing 6 of the stepping motor.

The stepping motor further comprises coil windings 14 and 15 wound around bobbins 12 and 13 are placed between the stator plates 8 and 9, and 10 and 11, respectively. By energizing the coil windings 14 and 15 in an appropriate sequence and direction, the stator plates produce a magnetic field which rotates the rotor 2 of the stepping motor in a clockwise or a counterclockwise direction.

In the above described construction of the conventional stepping motor, since the rotor shaft 1 is rotatably supported by the single bearing 3, a slight gap or play existing in a direction perpendicular to the shaft 1 tends to rotate the rotor 2 in a swinging manner, thus making it difficult to maintain a constant gap between the rotor 2 and the stator plates 8 through 11. That is, when a force is applied perpendicularly to the rotor shaft 1, the force tends to tilt the rotor shaft 1 relative to the axis of the stepping motor, thus rendering the gap between the rotor 2 and the stator plates 8 through 11 to be uneven. The tilting of the rotor shaft 1 adversely affects the torque and the precision in operation of the stepping motor, and makes it difficult to assure satisfactory operation of the stepping motor.

SUMMARY OF THE INVENTION

An object of the present invention is to provide a stepping motor wherein the above described difficulties of the conventional stepping motor can be substantially eliminated.

Another object of the invention is to provide a stepping motor wherein the gap between the rotor and the stator is maintained at a constant value, and the torque and the precision thereof are substantially improved.

These and other objects of the present invention can be achieved by a stepping motor comprising a stator including a plurality of stator plates, and a rotor made of a permanent magnet, characterized in that a coating layer made of a nonmagnetic material is applied to the stator plates, and the rotor is rotated within the stator plates while it is maintained in a closely adjacent relation slightly contactable with the coated layer of the stator plates.

Preferably, the coating layer is made of a plastic resin having a lubricating property.

Preferably, the stator includes two sets of stator plates which may be formed into one integral block or two separate blocks, both coated with a predetermined thickness of the plastic resin.

The invention will now be described in detail with reference to the accompanying drawings.

DESCRIPTION OF THE PREFERRED EMBODIMENT

Figure 1:
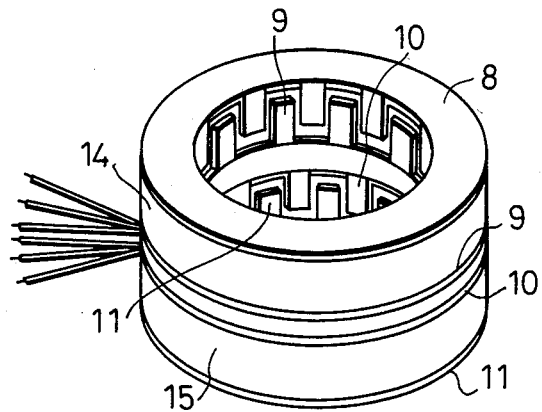
FIG. 1 is a perspective view showing a conventional stepping motor.
Figure 2:
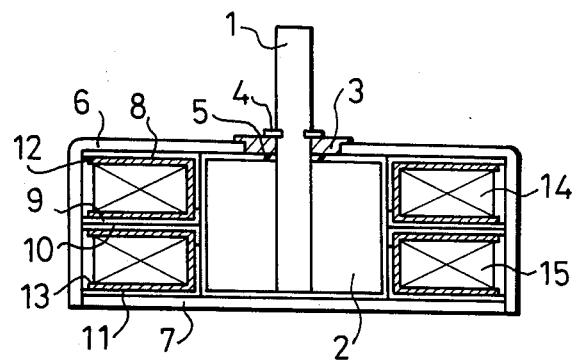
FIG. 2 is a sectional view of the stepping motor shown in FIG. 1.
Figure 3:
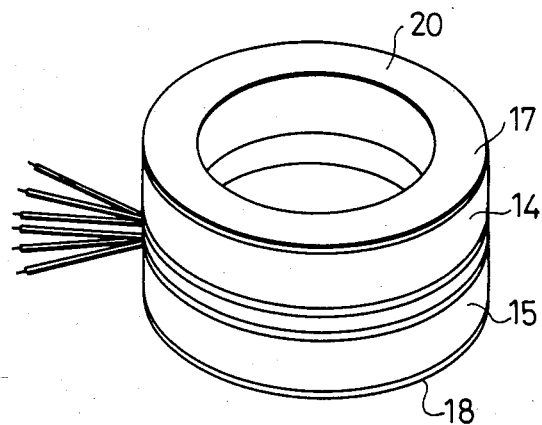
FIG. 3 is a perspective view showing a stepping motor according to the present invention.
Figure 4:
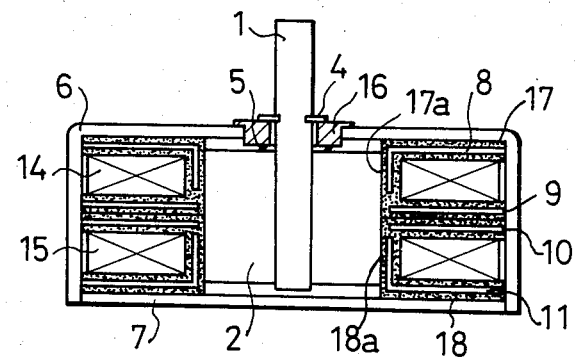
FIG. 4 is a sectional view of the stepping motor shown in FIG. 3.
Figure 5A:
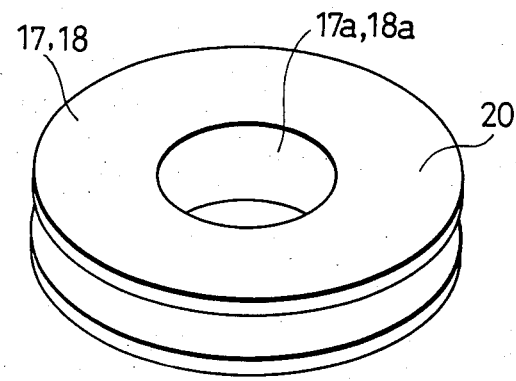
FIGS. 5(a) and 5(b) are a perspective view and a sectional view, respectively, showing a group of stator plates used in the invention which are formed into a block coated by a plastic resin.
Figure 5B:
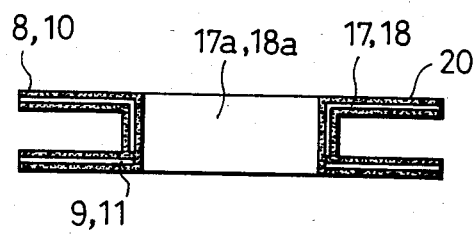

Referring to FIGS. 3 and 4, a stepping motor according to the present invention comprises a rotor 2 which is secured to a rotor shaft 1. A bearing 16 rotatably supports the rotor shaft 1 so that the rotor shaft 1 is displaceable only in the axial direction. A gap of reasonable width about the axial disposition of the rotor 2 is provided between the rotor shaft 1 and the bearing 16. Stator plates 8 and 9 are assembled together into a stator-plate group 17, while stator plates 10 and 11 are assembled together into a stator-plate group 18. In the stator-plate groups 17 and 18, the stator plates 8 and 9, and 10 and 11 are coated, as shown in FIGS. 5(a) and 5(b), by a coating layer 20 of a predetermined thickness which is made of a plastic material such as a fluorine resin having a lubricating property. With the above described construction, coil windings 14 and 15 are wound directly around the stator-plate groups 17 and 18, respectively, without utilizing bobbins 12 and 13 as in the case of the conventional stepping motor. The stator-plate groups 17 and 18 are secured within a motor housing 6, so that the rotor 2 is inserted in the central holes 17a and 18a of the stator-plate groups 17 and 18. In this case, since the coating layer 20 is formed on the stator-plate groups 17 and 18, the gap between the rotor 2 and the internal surfaces of the central holes 17a and 18a of the stator-plate groups 17 and 18 can be minimized, so that the occurrence of any undesirable play in a direction perpendicular to the axis of the rotor shaft 1 can be eliminated. In case the rotor 2 is brought into contact with the coating layer 20, the lubricating property of the coating layer 20 permits a smooth rotation of the rotor 2 when the coils 14 and 15 are energized at an appropriate sequence. A reference numeral 7 designates a rear cover secured on the rear side of the motor housing 6.

Figure 6:
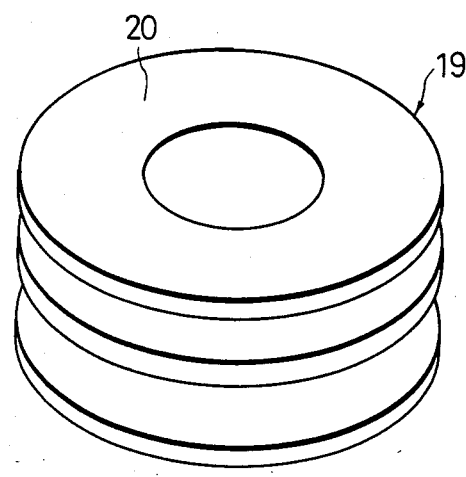
FIGS. 6(a) and 6(b) are a perspective view and a sectional view, respectively, showing two groups of stator plates used in the invention which are formed into a block coated by a plastic resin.
Figure 6:
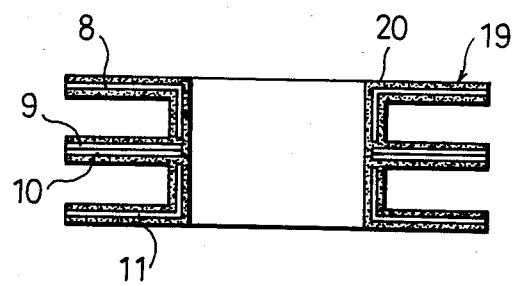

When it is preferable, the stator-plate groups 17 and 18 may be further combined as shown in FIG. 6(a) and 6(b) into a single stator-plate group 19.

According to the present invention, a coating layer having a lubricating property is provided on the surfaces of the stator plates for enabling the rotor to rotate closely adjacent, or in contact with the coating layer. As a consequence, play tending to occur in a direction perpendicular to the axis of the rotor shaft can be eliminated, and the torque and the precision of the stepping motor can be improved.

Since the stator plates are formed in combination into two stator-plate groups or a single stator-plate group, the coil winding bobbins required in the conventional stepping motor are not required, thus reducing the number of required parts and simplifying the assembling of the stepping motor. Furthermore, the sliding surface area of the rotation of the stepping motor increases, in comparison with the conventional construction, thus elongating the operational life of the stepping motor.

What is claimed is:

1. A stepping motor comprising:
   a housing having a first side and a second side;
   a shaft rotatable about an axis and rotatably supported by a bearing positioned at said first side of said housing;
   a permanent magnet rotor mounted on said shaft and having a predetermined rotor diameter;
   a stator plate group formed by an upper stator plate and a lower stator plate spaced apart from and parallel to each other and lying in planes perpendicular to said shaft axis, said stator plates having central inner holes concentric with each other and said shaft axis, an inner cylindrical surface connecting the stator plates along their central inner holes, said cylindrical surface and central inner holes having an inside diameter only slightly greater than said rotor diameter such that said rotor is disposed in close sliding contact with said cylindrical surface when said rotor is assembled in the central inner holes of said stator plate group, and a coil winding around an external side of said cylindrical surface between said upper and lower stator plates; and
   a dry coating layer made of a non-magnetic, self-lubricating material applied to at least said inner cylindrical surface of said stator plate group such that said rotor is smoothly and stably rotated in contact with said dry coating layer without any liquid or other lubricant applied between said stator plate group and said rotor and without the necessity for a second bearing for said shaft at said second side of said housing.

2. A stepping motor according to claim 1, wherein said coating layer is made of a plastic resin material.

3. A stepping motor according to claim 1, wherein two or more separate concentric stator plate groups are provided in stacked configuration, each having said coating layer applied thereto.

4. A stepping motor according to claim 1, wherein two or more concentric stator plate groups are formed together as a unit having said coating layer applied thereto.

* * * * *